US008888418B2

(12) United States Patent
Costa et al.

(10) Patent No.: US 8,888,418 B2
(45) Date of Patent: Nov. 18, 2014

(54) FAN RUB STRIP IN SITU MACHINING SYSTEM AND METHOD

(75) Inventors: Mark W. Costa, Storrs, CT (US); James E. Tracy, Cromwell, CT (US); David E. Valentine, East Hampton, CT (US); Raymond C. Ward, Ivoryton, CT (US); Dana H. Lewis, East Haddam, CT (US)

(73) Assignee: United Technologies Corporation, Hartford, CT (US)

( * ) Notice: Subject to any disclaimer, the term of this patent is extended or adjusted under 35 U.S.C. 154(b) by 2435 days.

(21) Appl. No.: 11/583,566

(22) Filed: Oct. 19, 2006

(65) Prior Publication Data

US 2008/0095590 A1    Apr. 24, 2008

(51) Int. Cl.
| B23C 1/20 | (2006.01) |
| F04D 29/16 | (2006.01) |
| F01D 11/12 | (2006.01) |
| F04D 29/54 | (2006.01) |
| F01D 5/00 | (2006.01) |
| B23C 3/02 | (2006.01) |
| F01D 25/00 | (2006.01) |

(52) U.S. Cl.
CPC .............. *F01D 25/00* (2013.01); *F04D 29/164* (2013.01); *F01D 11/12* (2013.01); *F04D 29/545* (2013.01); *F05D 2230/10* (2013.01); *F01D 5/005* (2013.01); *F05D 2230/80* (2013.01); *B23C 3/02* (2013.01); *F05D 2240/20* (2013.01)
USPC ............ 409/132; 409/139; 409/143; 409/179

(58) Field of Classification Search
USPC ......... 409/131–132, 139–140, 143, 178–179, 409/199
IPC ......................................................... B23C 1/20
See application file for complete search history.

(56) References Cited

U.S. PATENT DOCUMENTS

| 259,727 A * | 6/1882 | Smith ........................... 409/143 |
| 1,365,149 A * | 1/1921 | Breed ......................... 15/104.09 |

(Continued)

FOREIGN PATENT DOCUMENTS

| GB | 2240735 A * | 8/1991 |
| JP | 60161013 A * | 8/1985 |

OTHER PUBLICATIONS

Manual translation of JP 60-161013, translated Apr. 2011.*

(Continued)

*Primary Examiner* — Daniel Howell
(74) *Attorney, Agent, or Firm* — Carlson, Gaskey & Olds, P.C.

(57) ABSTRACT

An in situ fan case rub strip machining tool mounts to a LPT/fan rotor shaft assembly of a gas turbine engine. After a fan is removed therefrom such that the machining tool is rotatable about an engine axis of rotation in conjunction with rotation of the LPT/fan rotor shaft assembly. The machining tool permits machining of a rub strip within the fan case of the gas turbine engine without disassembly of the fan case from the core engine as heretofore required. As the machining tool is mounted to the LPT/fan rotor shaft assembly, the cutting tool is accurately locatable relative the engine axis of rotation such that the rub strip is evenly and precisely machined to be concentric with the engine axis to assure proper fan blade tip to rub strip interface.

12 Claims, 4 Drawing Sheets

(56) References Cited

U.S. PATENT DOCUMENTS

| | | | | |
|---|---|---|---|---|
| 2,188,720 | A | * | 1/1940 | McQuade .................... 451/441 |
| 2,671,478 | A | * | 3/1954 | Anderson et al. .......... 144/24.12 |
| 3,145,622 | A | * | 8/1964 | Rust et al. .................... 409/121 |
| 3,175,465 | A | * | 3/1965 | Fuller et al. .................. 409/132 |
| 3,603,204 | A | * | 9/1971 | Anderson et al. ............. 409/179 |
| 3,608,172 | A | * | 9/1971 | Lindquist .................... 29/889.2 |
| 3,687,007 | A | * | 8/1972 | Harris .......................... 409/178 |
| 3,910,159 | A | | 10/1975 | Gladwin |
| 4,177,610 | A | * | 12/1979 | Farkas et al. ................. 451/439 |
| 4,216,893 | A | | 8/1980 | Glatthorn |
| 4,329,769 | A | | 5/1982 | Glatthorn |
| 4,362,447 | A | * | 12/1982 | Pekar et al. .................... 409/200 |
| 4,478,552 | A | | 10/1984 | Thompson |
| 4,534,698 | A | | 8/1985 | Tomich |
| 5,281,062 | A | | 1/1994 | Dunkman |
| 5,791,789 | A | | 8/1998 | Van Duyn et al. |
| 6,575,011 | B1 | | 6/2003 | Busby et al. |

OTHER PUBLICATIONS

Extended European Search Report, date Apr. 1, 2011, EP Application No. 07254123.8.

* cited by examiner

FAN RUB STRIP IN SITU MACHINING SYSTEM AND METHOD

BACKGROUND OF THE INVENTION

The present invention relates to in situ machining of gas turbine engine components, and more particularly to in situ machining of a fan nacelle rub strip without requiring significant disassembly of the case from the engine.

A gas turbofan engine includes a high-volume fan at its forward end for forcing ambient air into a core flow passage entering an axial compressor, combustor and turbine and a fan flow passage which bypasses the core flow passage and provides direct thrust. The fan is at the forward section of the engine and is the rotating element most at risk of damage in impact with foreign objects. Damage of the fan may, in an extreme case, dislodge a fragment of the fan.

In order to contain such fragments, blade fragment containment structures typically include an annular band of a high strength material which surround the tips of the fan blades for intercepting such fragments before they can pass out of the engine. The blade fragment containment structure includes a rub strip against which the fan blade tips are closely fitted to provide a seal area which minimizes air leakage over the fan blade tips. The rub strip is manufactured of a material which may be smoothly worn away by the fan blade tips so that as tight a tip seal as possible is obtained.

During initial assembly and testing of a gas turbine engine the interface between the rub strip and the fan blade tips may not be properly configured. Furthermore, during testing the rub strip may become unevenly worn resulting in an eccentricity which may result in improper test results. In either situation, the core engine must be disassembled from the fan case and fan nacelle such that the rub strip may be replaced or machined to refine the interface or correct the eccentricity thereof. Such disassembly and reassembly may require significant time and increase the expense and complexity of engine development.

Accordingly, it is desirable to provide an efficient system and method to assure a proper fan blade tip to rub strip interface.

SUMMARY OF THE INVENTION

The in situ fan case rub strip machining tool according to the present invention mounts to a fan rotor shaft assembly of a gas turbine engine. The machining tool generally includes a mount plate, a beam attached to the mount plate, a cutting tool and a counterbalance mounted to the beam. The tool is mountable to a fan hub of an engine fan rotor shaft assembly once the fan blades are removed therefrom such that the machining tool is rotatable about an engine axis of rotation in conjunction with rotation of the rotor shaft assembly.

The tool permits machining of a rub strip within the fan nacelle of the gas turbine engine without disassembly of the fan nacelle from the core engine as heretofore required. As the machining tool is mounted to the rotor shaft assembly, the cutting tool is accurately locatable relative the engine axis of rotation.

In operation, the fan blades are removed from the fan rotor shaft assembly subsequent to a determination that interference between the rub strip and the fan blade tips are improper or subsequent to fan rub strip replacement. The in situ fan case rub strip machining tool is mounted to the rotor shaft assembly and the tool motor positioned relative a compound milling table to position the tool bit relative the engine axis of rotation. The tool motor is then spun up and the in situ fan case rub strip machining tool is rotated about the engine axis of rotation in combination with the rotor shaft assembly to thereby machine the rub strip inner diameter. The in situ fan case rub strip machining tool may be rotated by hand such that the rub strip is evenly and precisely machined concentric with the engine axis to assure proper fan blade tip to rub strip interface.

The present invention therefore provides an efficient system and method to assure a proper fan blade tip to rub strip interface.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
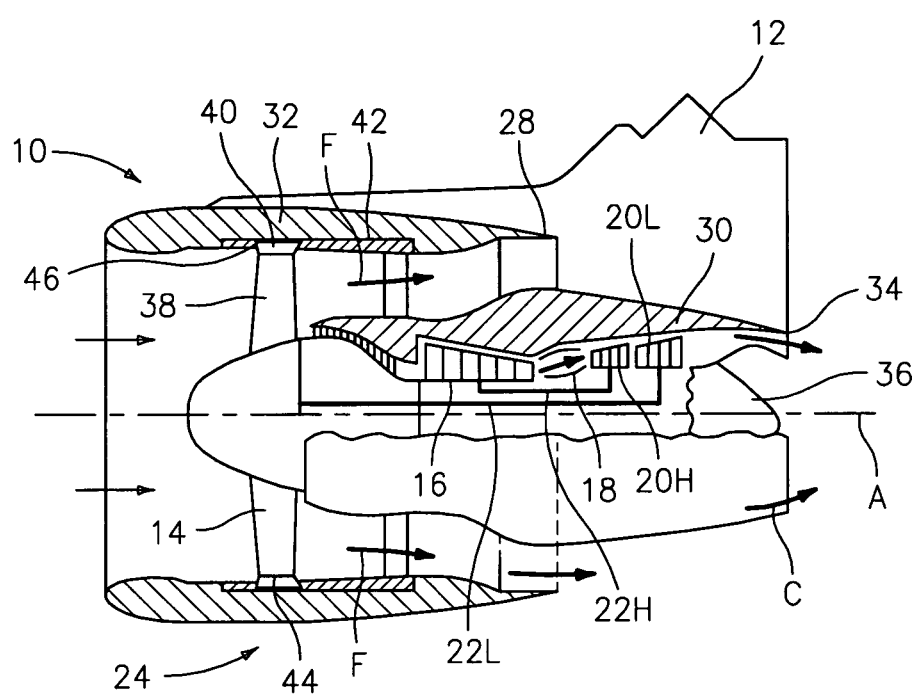
FIG. 1 is a general schematic view of an exemplary gas turbine engine for use with the present invention.

FIG. 1 illustrates a general partial fragmentary view of a gas turbofan engine 10 suspended from an engine pylon 12 as typical of an aircraft designed for subsonic operation. The engine 10 is preferably a high-bypass turbofan aircraft engine. The engine 10 typically includes in serial flow communication with a low pressure compressor driven fan assembly 14, a high pressure compressor 16, an annular combustor 18, high pressure turbine 20H, and low pressure turbine 20L. During operation, air is pressurized in the compressor and mixed with fuel in the combustor for generating hot combustion gases which flow through the high and low pressure turbines that extract energy therefrom. The high pressure turbine 20H powers the high pressure compressor through a HPT/HPC shaft assembly 22H and the low pressure turbine 20L powers the low pressure compressor fan assembly 14 through a LPT/Fan rotor shaft assembly 22L. It should be understood that the shaft assembly 22 may include various shafts which coaxially rotate in a common or counter rotations arrangement.

The exemplary turbofan engine 10 is in the form of a high bypass ratio engine mounted within a nacelle assembly 24 in which most of the air pressurized by the fan assembly 14 bypasses the core engine itself for generating propulsion thrust. The fan air F is discharged from the engine 10 through a fan nozzle section 28 defined radially between a core nacelle 30 and a fan nacelle 32. The core exhaust gases C are discharged from the core engine through a core exhaust nozzle 34 defined between the core nacelle 30 and a center plug 36 disposed coaxially therein around an engine longitudinal centerline axis A of the engine 10 and nacelle.

The fan assembly 14 includes a plurality of circumferentially spaced fan blades 38 which may be made of a high-strength, low weight material such as a titanium alloy. An annular blade containment structure 40 is typically disposed within a fan case 42 immediately surrounding the path of blades 38 to receive blade fragments which may be accidentally released and retaining them without permitting them to become free projectiles exterior to fan jet engine 10.

A rub strip 46 is located within the containment structure 40 against which blade tips 44 of the fan blades 38 are closely fitted to provide a sealing area for reducing the amount of air leaking past the blade tips 44. The rub strip 46 is manufactured of a material which may be in intermittent contact with the tips 44 of the blades 38 during operation.

Figure 2:
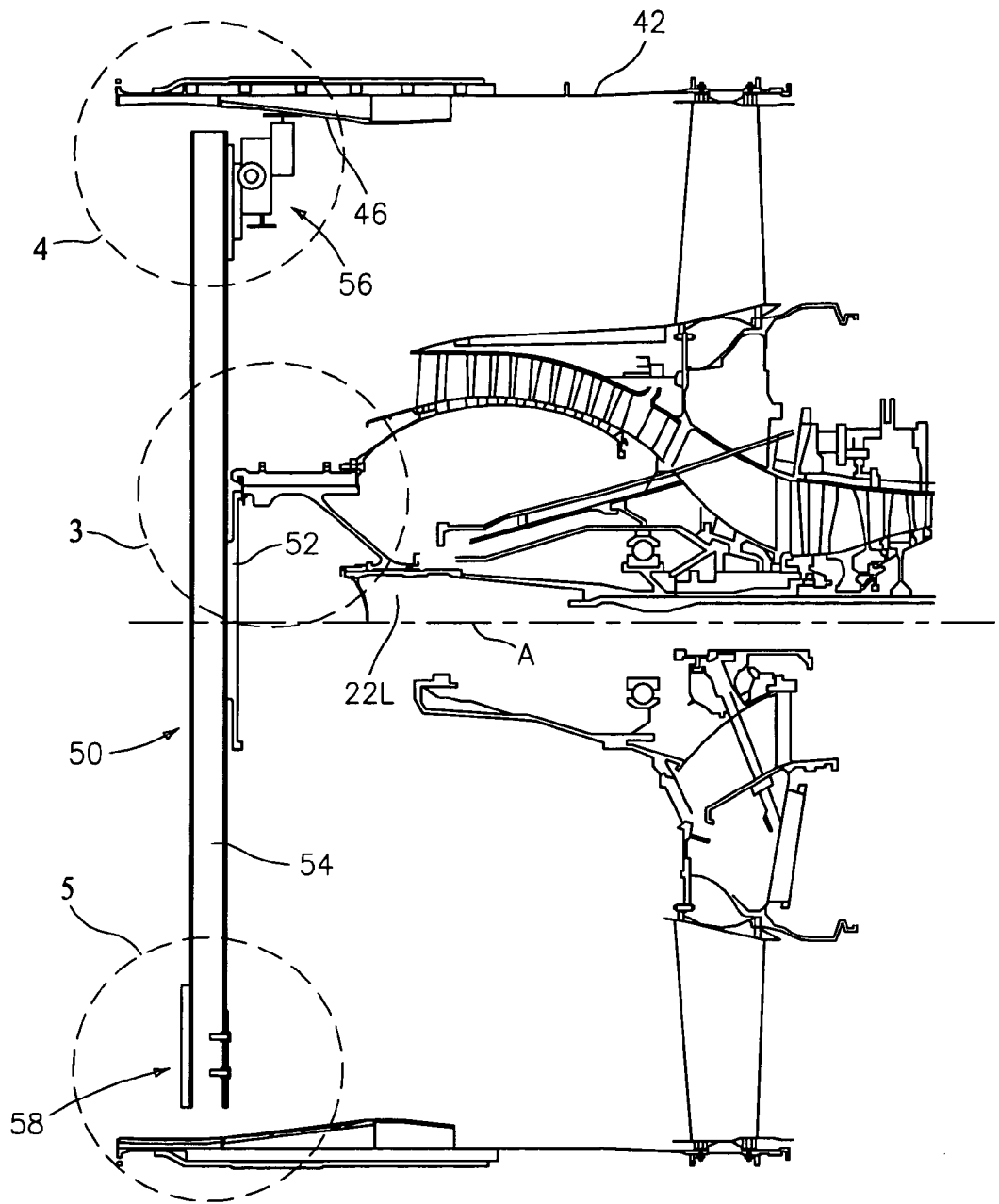
FIG. 2 is a general longitudinal sectional view of an exemplary gas turbine engine with an in situ fan case rub strip machining tool mounted thereto.

Referring to FIG. 2, an in situ fan case rub strip machining tool 50 according to the present invention is illustrated mounted to the low pressure/fan rotor shaft assembly 22L. The tool 50 generally includes a mount 52, a beam 54 attached to the mount 52, and a cutting tool assembly 56 and counterbalance 58 mounted to the beam 54. The machining tool 50 permits machining of the rub strip 46 without disassembly of the fan case 42 and fan nacelle 32 from the core engine as heretofore required.

Figure 3:
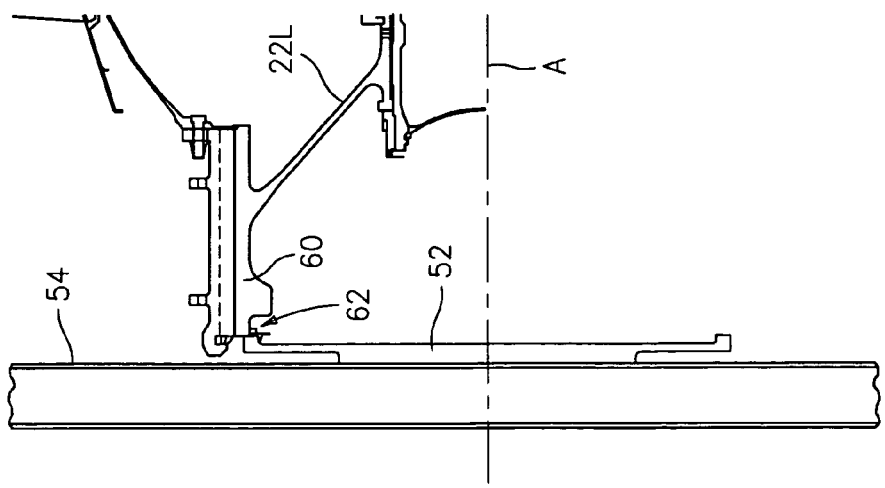
FIG. 3 is an expanded view of a mount of the in situ fan case rub strip machining tool.

The mount 52 is preferably manufactured for mounting to a fan hub 60 of the LPT/Fan rotor shaft assembly 22L once the fan blades 38 are removed therefrom such that the machining tool 50 is rotatable about axis A in conjunction with rotation of the LPT/Fan rotor shaft assembly 22L. That is, the machining tool 50 replaces the fan blades 38 and mounts to the rotor shaft assembly 22 utilizing the spinner bolt circle structure 62 (FIG. 3) that mounts the fan assembly 14.

The beam 54 is preferably a tubular member which is rectilinear in crosssection. The beam 54 is fixed to the mount 52 and is preferably of a length just shorter than the diameter of the fan case 42. The beam 54 supports the cutting tool assembly 56 toward one end segment (also shown in FIG. 4) and the counterbalance 58 (also shown in FIG. 5) on the opposite end segment which counterbalances the cutting tool 56.

Figure 4:
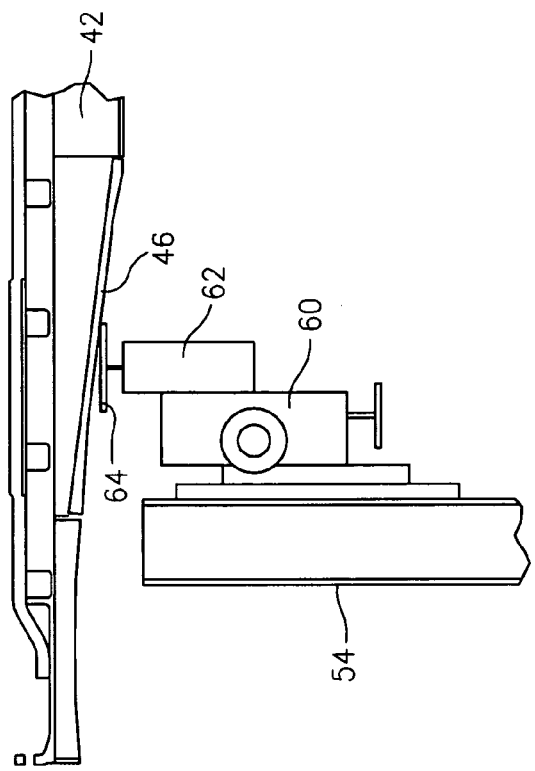
FIG. 4 is an expanded view of a cutting tool assembly of the in situ fan case rub strip machining tool.
Figure 5:
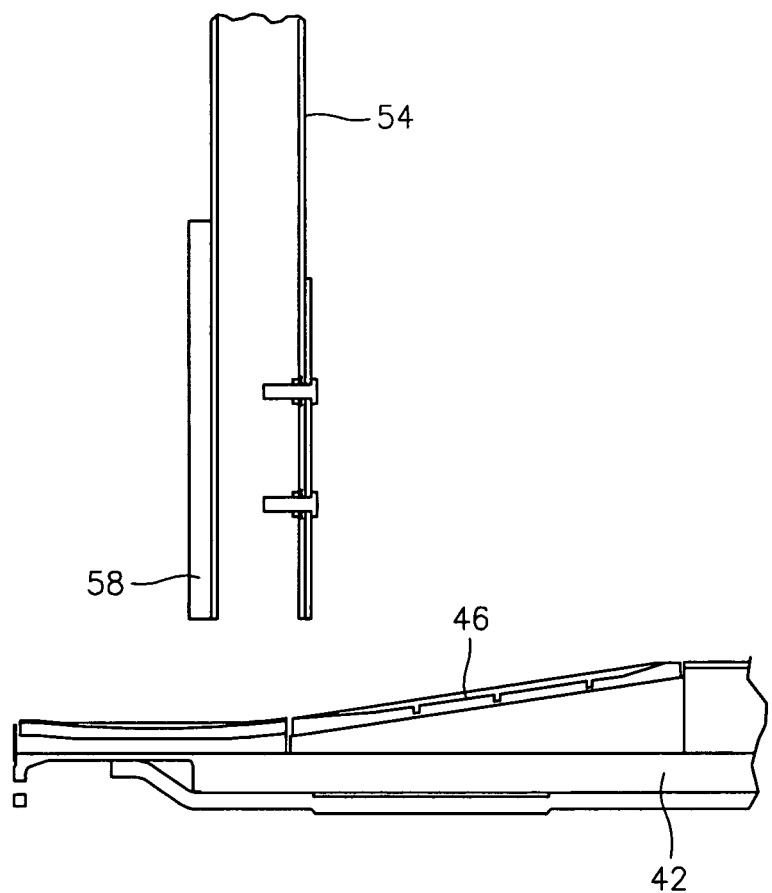
FIG. 5 is an expanded view of a counterbalance of the in situ fan case rub strip machining tool.

Referring to FIG. 4, the cutting tool assembly 56 generally includes a compound milling table 60 mounted to the beam 54 and a tool motor 62 such as a drill motor mounted to the compound milling table 60. The tool motor 62 is movable relative the compound milling table 60 to position a tool bit 64 such as a horizontal mill cutter in a precise location. As the tool bit 64 is mounted to the rotor shaft assembly 22L, the cutting tool 64 is accurately locatable relative the engine axis A. The compound milling table 60 provides a multiple of degrees of freedom of adjustment for the tool motor 62 relative the compound milling table 60 to adjust the tool bit 64 position relative the beam 54 and thus the axis A. It should be understood that the tool bit 64 may be of any shape to specifically match the blade tips 44 of the fan blades 38 to the rub strip 46.

In operation, the fan blades 38 are removed from the LPT/Fan rotor shaft assembly 22L subsequent to a determination that interference between the rub strip 46 and the fan blade tips 44 are improper or subsequent to fan rub strip 46 replacement. The in situ fan case rub strip machining tool 50 is then mounted to the LPT/Fan rotor shaft assembly 22L. The tool motor 62 is then positioned relative the compound milling table 60 to position the tool bit 64 relative the axis A. The tool motor 62 is then spun up and the in situ fan case rub strip machining tool 50 is rotated about the axis A in combination with the LPT/fan rotor shaft assembly 22L. The in situ fan case rub strip machining tool 50 may be rotated manually (by hand) such that the rub strip 46 is evenly and precisely machined to be concentric with the axis A to assure proper fan blade tip to rub strip interface. Alternatively, the tool 50 may be rotated mechanically through a motor drive system or the like.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fan case rub strip machining tool comprising:
    a mount mountable to a LPT/Fan rotor shaft assembly which rotates about an engine axis of rotation;
    a beam attached to said mount;
    a cutting tool assembly mounted to a segment of said beam; and
    a counterbalance mounted to said beam to at least partially counterbalance said cutting tool assembly for manual rotation of the fan case rub strip machining tool.

2. The tool as recited in claim 1, wherein said cutting tool assembly includes a compound milling table mounted to said beam and a tool motor mounted to said compound milling table such that said tool motor is movable relative said compound milling table to position a tool bit of said tool motor.

3. The tool as recited in claim 2, wherein said tool motor includes a drill motor.

4. The tool as recited in claim 2, wherein said tool bit includes a horizontal mill cutter tool bit.

5. A method of machining a rub strip within an engine fan case comprising the steps of:
    mounting a fan case rub strip machining tool to a LPT/fan rotor shaft assembly defined about an engine axis of rotation; and
    manually rotating the fan case rub strip machining tool about the engine axis of rotation such that the fan case rub strip machining tool machines an inner diameter of a rub strip mounted to an engine fan case.

6. The method as recited in claim 5, further comprising:
    positioning a cutting tool relative the engine axis of rotation.

7. The method as recited in claim 6, further comprising:
    positioning a tool motor relative a compound milling table mounted to a beam of the fan case rub strip machining tool.

8. The method as recited in claim 5, further comprising:
    retaining the engine fan case in a mounted relationship to a core engine during said mounting and manually rotating.

9. The tool as recited in claim 1, wherein said mount mounts to the LPT/Fan rotor shaft assembly through a spinner bolt circle structure.

10. The tool as recited in claim 9, wherein said mount replaces a fan assembly.

11. The method as recited in claim 6, further comprising:
    mounting the fan case rub strip machining tool to the LPT/Fan rotor shaft assembly through a spinner bolt circle structure.

12. The method as recited in claim 6, further comprising:
    replacing a fan assembly with the fan case rub strip machining tool.

* * * * *